Oct. 6, 1925.

G. S. BAKER ET AL 1,556,196

APPARATUS FOR THE MANUFACTURE OF BISCUITS AND THE LIKE

Filed Dec. 27, 1924

Inventors
GEORGE SAMUEL BAKER,
GEORGE RALPH BAKER.

Attorney

Patented Oct. 6, 1925.

1,556,196

UNITED STATES PATENT OFFICE.

GEORGE SAMUEL BAKER AND GEORGE RALPH BAKER, OF LONDON, ENGLAND, ASSIGNORS TO BAKER-PERKINS COMPANY INCORPORATED, OF WHITE PLAINS, NEW YORK, A CORPORATION OF NEW YORK.

APPARATUS FOR THE MANUFACTURE OF BISCUITS AND THE LIKE.

Application filed December 27, 1924. Serial No. 758,341.

*To all whom it may concern:*

Be it known that we, GEORGE SAMUEL BAKER and GEORGE RALPH BAKER, both residing at London, England, subjects of the King of Great Britain and Ireland, have invented certain new and useful Improvements in Apparatus for the Manufacture of Biscuits and the like, of which the following is a specification.

This invention relates to apparatus for the manufacture of biscuits, lozenges and the like (hereinafter referred to as biscuits) of that class in which the biscuits are cut from a sheet of dough carried on a continuously or intermittently driven web, and in which the scrap of the dough sheet from which the biscuits are cut is removed from around the cut biscuits by being carried up on an inclined web while the biscuits travel forwards below this to be delivered to pans or other receptacles.

The invention comprises novel and improved means for separating the scrap, including devices which cause the scrap separation to be more positive. The invention also provides means whereby the scrap of short or brittle dough can be removed with less fear of breaking the sheet.

The invention consists in means for imparting reciprocatory movement to the scrap conveyor in relation to the conveyor on which the biscuits are cut from the sheet of dough, and means for varying the amplitude of said movement or discontinuing it at will.

The invention also consists in the combination with the means just stated of other means for adjusting the ends of the cutting conveyor and the scrap conveyor in relation to one another and to a further conveyor on which the pans or receptacles are carried and which for brevity may be termed the removing or panning conveyor, so that the scrap can be removed by said scrap conveyor at different points relatively to said cutting and removing conveyors.

The accompanying drawing illustrates so much of a biscuit machine, having the present improvements applied thereto, as is necessary for comprehension of the invention and in said drawings:—

The web $a$ on which the biscuits are cut is carried at its delivery end round a knife edge or equivalent $a^1$ so arranged that the cut biscuits are delivered onto a panning or other conveyor web $b$ passing immediately below it. The knife edge is made adjustable and is mounted in slides $a^2$, one at each side of the machine, and adjustable in guides $a^3$ as by means of screws $a^4$ so that it may be set forward or back for a purpose explained later. The scrap web $c$ which may also pass about a knife edge $c^1$, as shown, or be otherwise suitably guided, has this knife edge or guide mounted in blocks $c^2$ slidable in a frame or support $c^3$, one at each side, and is adapted for adjustment longitudinally of the apparatus as by means of screws $c^4$ provided with lock-nuts $c^5$ said frame being also so arranged that it can be given a rising and falling movement actuated for example by the cutting mechanism of the machine. The said movement of the scrap web is so controlled that it can be made greater or smaller at will, or be thrown out of action altogether, this being shown as effected by mounting the frames $c^3$ each on a lever $d$ loosely fulcrumed on a shaft $d^1$ on which are also rigidly mounted double-armed levers, one arm $d^2$ of each being acted on by a cam $d^3$ on a shaft $d^4$ which may be driven in synchronism with the cutting mechanism of the machine or otherwise timed as may be required and on the other arm $d^5$ of which bears a screw $e$ passing through a lug $e^1$ on the frame $c^3$. A further adjustment or the like which may comprise, as shown, screws $f$ passing through lugs $f^1$ on the frame $c^3$ and bearing on stationary side frames $g$ of the machine is provided which regulates the height when at rest of the scrap web knife-edge $c^1$ from the cutting or panning webs $a$ and $b$ respectively.

The rising and falling motion of said scrap web knife edge gives to the scrap a slight pull or jerk, which causes a more positive separation of the scrap; on the other hand for doughs so delicate that they cannot stand such an action it may be discontinued by appropriate manipulation of the screws $e$.

The longitudinal adjustments provided on the cutting web knife edge $a^1$ and the scrap web knife edge $c^1$ may be used to give different relative positions to these webs which may be required for various classes of dough passed through the machine.

Figure 1:
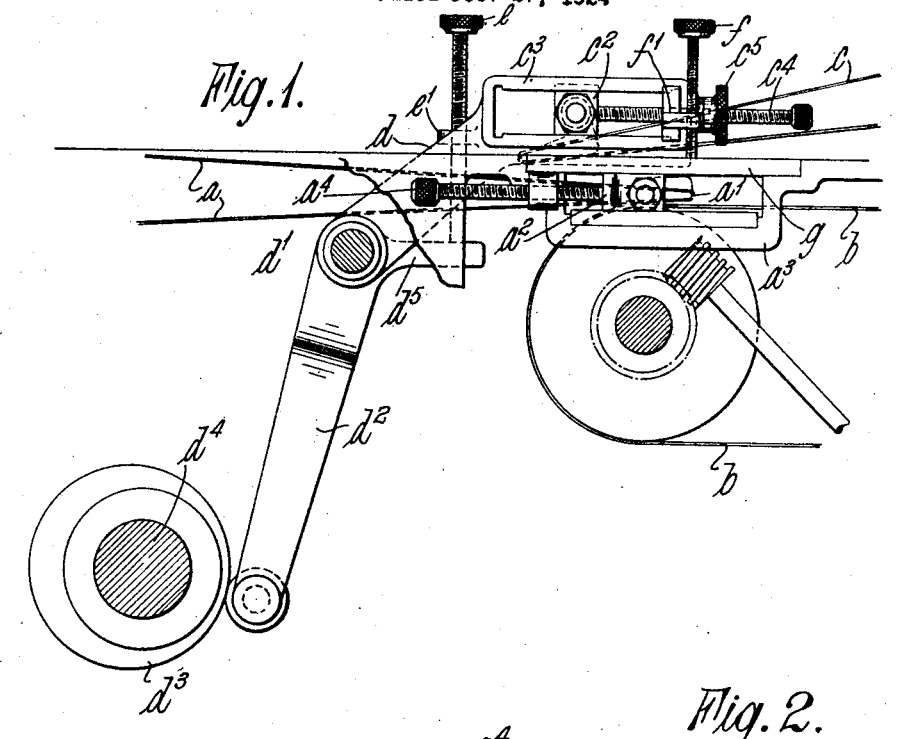
Fig. 1 is a side elevation with parts in section.
Figure 2:
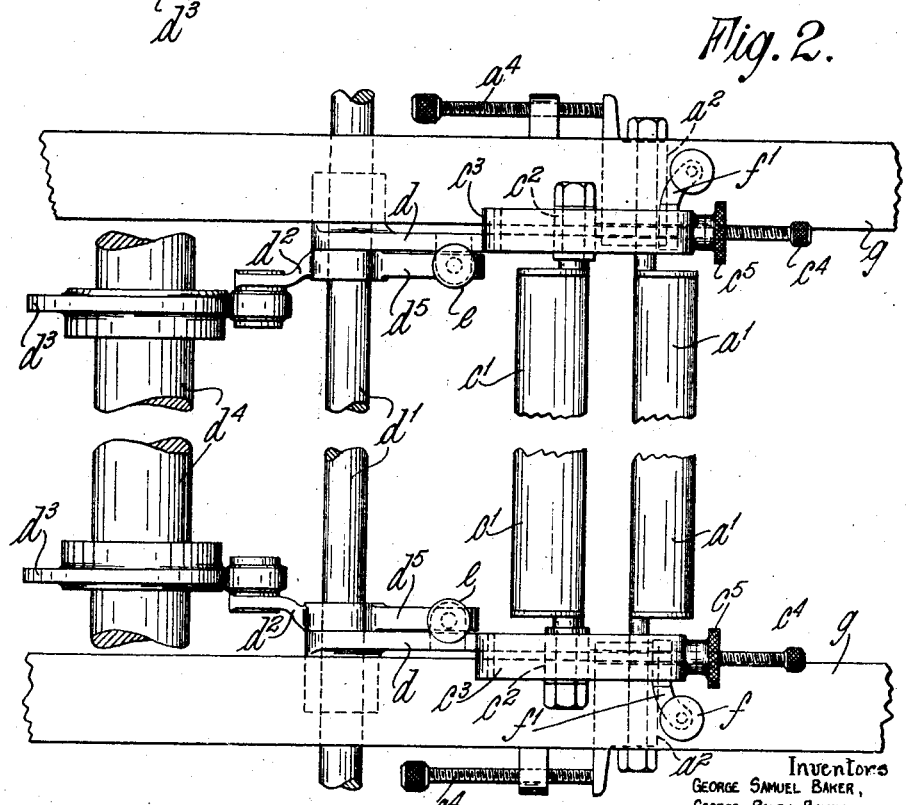
Fig. 2 is a plan view with the actual conveyors or webs removed for clearness of illustration.

The said cutting web knife-edge $a^1$ may be set forward and the scrap knife-edge $c^1$ also set forward in its respective slide so that the scrap is removed from the biscuits before they are transferred to the panning web, this being the position shown in Figure 1 of the drawings.

Alternately the cutting web knife-edge $a^1$ may be set back and the scrap web knife edge $c^1$ also set back so that the scrap and biscuits are transferred together from the cutting to the panning web, and the scrap is removed from the biscuits after they are transferred to the panning web.

A third arrangement is so to set the knife edges that the scrap is removed from the biscuits at the moment they are transferred from the cutting web $a$ to the panning web $b$. This arrangement is employed where the dough is very short or brittle, and enables the scrap to be removed with less danger of breaking the sheet.

What we claim as our invention and desire to secure by Letters Patent of the United States is:—

1. In apparatus for the manufacture of biscuits, the combination of a conveyor on which dough is cut a scrap conveyor receiving the scrap from said cutting conveyor, and means for imparting reciprocating movements to said scrap conveyor in relation to the cutting conveyor.

2. In apparatus for the manufacture of biscuits, the combination of a conveyor on which the biscuits are cut from the dough, a scrap conveyor receiving the scrap from said cutting conveyor, means for imparting reciprocating movements to said scrap conveyor in relation to the cutting conveyor, and means for varying the amplitude of said reciprocatory movement or discontinuing it at will.

3. In apparatus for the manufacture of biscuits the combination of a conveyor on which the biscuits are cut from the dough, a second conveyor receiving the scrap from the first conveyor, a third conveyor receiving the cut biscuits from said first conveyor, means for imparting reciprocatory movements to said second conveyor in relation to the first conveyor, and means for adjusting adjacent ends of the first and second conveyors in relation to one another and to said third conveyor.

4. In apparatus for the manufacture of biscuits, the combination with a cutting conveyor, a scrap conveyor and a cut biscuit removing conveyor all having their ends adjacent one another, of means for imparting reciprocatory movement to said scrap conveyor in relation to the cutting conveyor, means for varying the amplitude of said reciprocatory movement or discontinuing it at will, and means for adjusting the ends of the cutting conveyor and the scrap conveyor in relation to one another and to the removing conveyor whereby the scrap can be removed by the scrap conveyor at different points relatively to said cutting and removing conveyors.

5. In apparatus for the manufacture of biscuits, the combination of a conveyor on which biscuits are cut from the dough, a scrap conveyor receiving the scrap from said cutting conveyor, a knife edge about which said scrap conveyor passes, rocking means for imparting rising and falling movements to said knife edge relatively to the cutting conveyor, and screw means acting on said rocking means for adjusting the extent of said movements.

6. In apparatus for the manufacture of biscuits, the combination of a conveyor on which biscuits are cut from the dough, a scrap conveyor receiving the scrap from said cutting conveyor, a knife edge about which said scrap conveyor passes, rocking means for imparting rising and falling movements to said knife edge relatively to the cutting conveyor, and screw means acting on said rocking means for adjusting the extent of said movements, or preventing said movements at will.

7. In apparatus for the manufacture of biscuits, the combination of a conveyor on which the biscuits are cut from the dough, a scrap conveyor receiving the scrap from said cutting conveyor, means for imparting reciprocatory movements to said scrap conveyor in relation to said cutting conveyor and means for both horizontal and vertical adjustment of adjacent ends of the cutting and scrap conveyor in relation to one another.

In witness whereof we have signed this specification.

GEORGE SAMUEL BAKER.
GEORGE RALPH BAKER.